INVENTOR.
JOSEPH R. VADUS

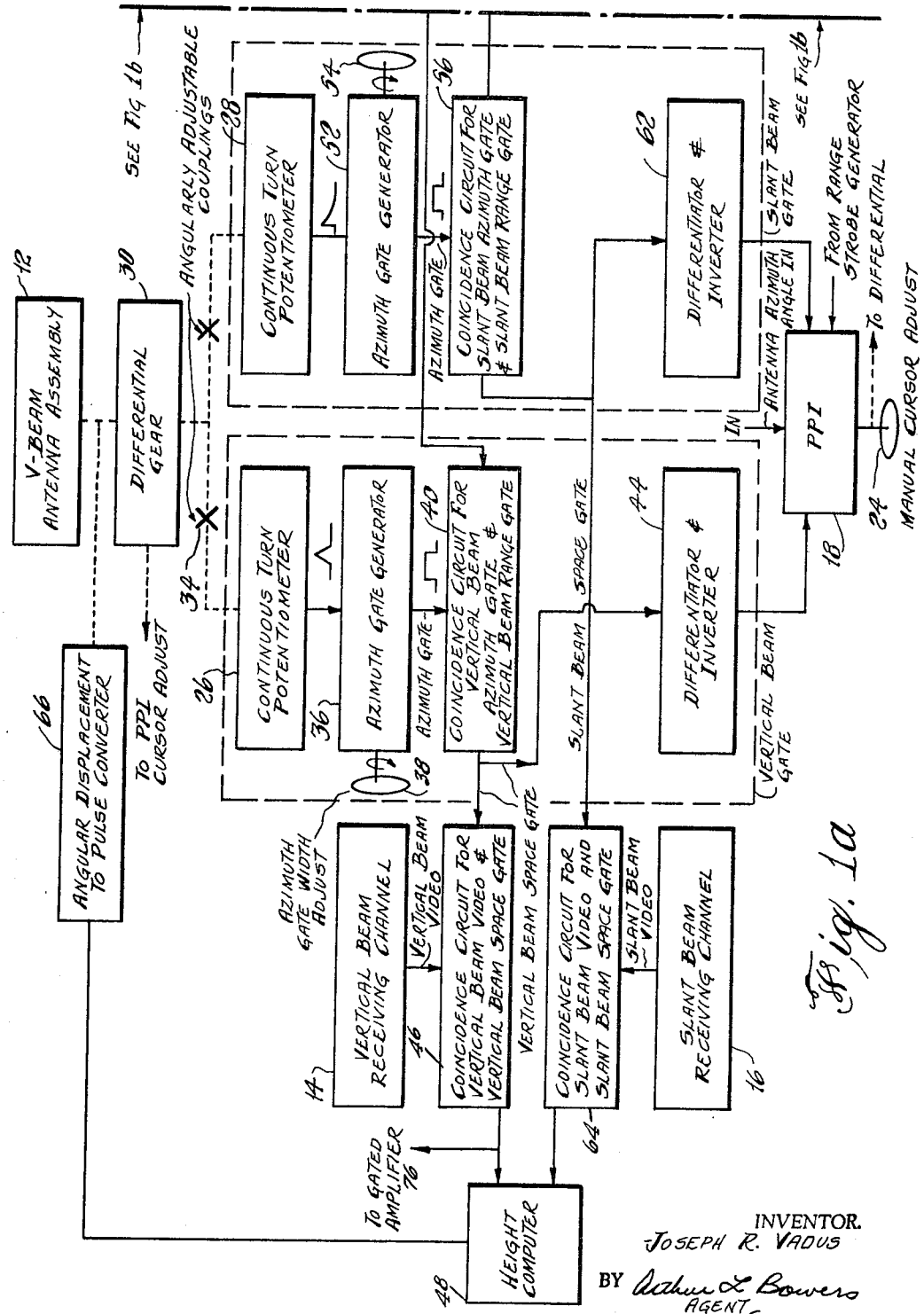

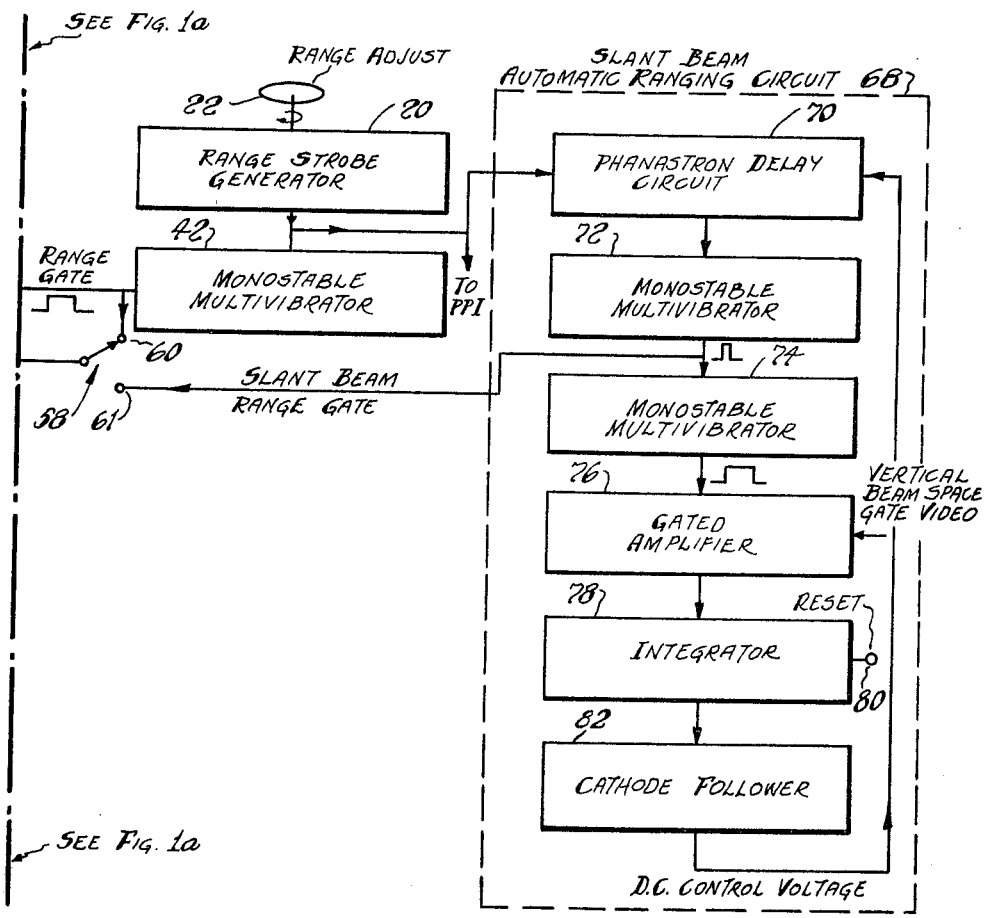

United States Patent Office 3,267,469
Patented August 16, 1966

3,267,469
AUTOMATIC RANGE GATING FOR V-BEAM RADAR
Joseph R. Vadus, Carle Place, N.Y., assignor, by mesne assignments, to the United States of America as represented by the Secretary of the Navy
Filed Apr. 6, 1964, Ser. No. 357,829
3 Claims. (Cl. 343—11)

This invention relates to obtaining more accurate height information from V-beam radar and more particularly to automatic target gating techniques for the video returned by slant beam.

A V-beam is formed by a vertical sheet beam and a slant sheet beam which are related by the V-beam angle. Range and azimuth information on a target are obtained with the vertical beam. Height finding information on a target is obtained by the use of the slant beam with the vertical beam. The antenna assembly is designed to operate in a manner such that the slant beam trails the vertical beam. A PPI display of the vertical beam echoes is used by the operator when selecting a target and for extracting range and azimuth information on the selected target. The correlation of echoes returned by vertical and slant beams from a selected target provide the information needed for use in height finding. The angle through which the antenna assembly rotates between illumination of a target by the vertical beam and illumination of the same target by the slant beam is the turn angle. The turn angle is needed for computing the height. U.S. Patent No. 2,704,843 includes discussion on V-beam radar.

To determine the height of a target with a V-beam radar system, range and azimuth gates of the vertical beam receiving channel are centered on the selected target on the PPI display and the range and azimuth information are obtained from the vertical beam echoes presented on the PPI. The range and azimuth gates of the slant beam receiving channel are centered on the same target. To obtain the correct turn angle, the range gates and azimuth gates are adjusted by the operator insofar as possible to admit vertical beam and slant beam echoes solely from the selected target. Then the turn angle for the selected target is measured as accurately as possible. The height is computed from range and turn angle corrected for earth's curvature, atmospheric refraction, etc. If the gates, particularly the slant beam gates admit echoes from the selected target plus echoes from one or more non-selected targets, the turn angle is ambiguous.

While the gates should be made as narrow as possible, they must be of sufficient size so that the target does not maneuver out of the gates during successive scans.

The PPI operator selects a target by aligning the azimuth cursor to bisect that target. He then adjusts the range strobe to move the range marker along the cursor to intersect the target. The azimuth cursor sweep is time shared with the radar sweep. The range marker is displayed with the cursor sweep and therefore it can only be positioned along the cursor sweep. The intersection of the azimuth cursor and range marker provides a reference point for aligning the target gate. The target gate extends before and after the target in range and in azimuth to prevent the target from maneuvering out of the gate on the next scan. The vertical beam target gate is automatically centered about the range strobe and is illuminated on the PPI by the radar sweep so that it frames the target. Neither the slant beam video nor the slant beam gate is displayed on the PPI. However, the slant beam gate is designed so that it immediately follows the vertical beam gate and extends long enough to provide for a maximum turn angle to intercept the video somewhere in the slant beam.

A V-beam radar is essentially a search radar and not a tracking radar. Any selected target is not illuminated by the radar beams for most of the period of a complete rotation of the antenna assembly. Since the period of rotation of the antenna assembly is several seconds, the range and azimuth acquisition gates for the vertical beam which gate vertical beam target information into the height computer must be large enough so that present-day high-speed targets do not maneuver out of the acquisition gates during an antenna rotation period. Therefore, large volume acquisition cannot be avoided for the vertical beam.

Large volume acquisition has been a weakness of V-beam radar systems. Gating into a height computer information from a large volume of the space scanned by the slant beam gives rise to a substantial probability that information on interfering targets will be introduced into the computer and cause ambiguity and error. Therefore, the use of V-beam radar has been saddled with the difficulty of maintaining an acquisition gate voluminous enough to prevent a selected target from maneuvering out of the gate in the period of an antenna rotation, and at the same time, limiting the amount of extraneous information gated into the height computer.

An object of this invention is to maintain large volume target acquisition coverage and at the same time reduce multiple target information from being coupled to the height computer to reduce computer ambiguity.

Another object is to display on the face of a cathode ray tube that portion of the total video received which is gated into the height computer.

A further object is to obtain more accurate, more reliable height information from a V-beam radar and in less time than heretofore.

Other objects and advantages will appear from the following description of an example of the invention, and the novel features will be particularly pointed out in the appended claims.

FIGS. 1a and 1b comprise two adjoining parts of a block diagram which joined together illustrate an embodiment of this invention coupled to those portions of a V-beam radar required for an explanation of this invention;

FIG. 5 is a schematic diagram of the circuit arrangement of another continuous-turn potentiometer included in the block diagram of FIG. 1a;

Figure 2:
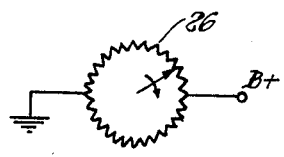
FIG. 2 is a schematic diagram of the circuit arrangement of a continuous-turn potentiometer included in the block diagram shown in FIGS. 1a and 1b.

The embodiment of the invention shown in FIGS. 1a and 1b is operatively coupled to the V-beam antenna assembly 12 and other basic elements of a V-beam radar only some of which are shown in FIGS. 1a and 1b. The antenna assembly 12 is rotatable and includes a vertical beam antenna and a slant beam antenna coupled by means, not shown, to respective receiver channels 14 and 16 and to a pulse transmitter, not shown. A PPI 18 is coupled to the rotatable antenna assembly 12 and initiates a radial scan of moderate brightness on the face of the cathode ray tube of the PPI for each transmitter pulse. Successive radial scans are progressively angularly displaced to follow the vertical beam antenna in azimuth; the radial scans taken together are termed the cursor sweep. A range strobe generator 20 having a range adjust 22 generates short pulses at the pulse repetition frequency of the transmitter, adjustable in time phase, and supplies these pulses for presentation at a selected range along the cursor sweep, as range marking pulses. Echoes or target video are presented on the cathode ray tube face at positions corresponding in azimuth and range to the respective targets. The PPI includes an azimuth cursor which is angularly displaceable manually by the manual cursor adjust 24 relative to the axis of the cathode ray tube for centering over and establishing the azimuth location of a selected target presented on the cathode ray tube.

Each of the above-mentioned basic components are conventional in a V-beam radar. The wipers of continuous-turn potentiometers 26 and 28, e.g. Helipots, are coupled by a differential gear 30 to a shaft that follows the rotation of antenna assembly 12. The azimuth indicating cursor of the PPI 18 is coupled to the differential gear 30 whereby angular displacement of the azimuth indicating cursor by manual adjust 24 is accompanied by equal angular displacement of the potentiometer wipers relative to the antenna assembly. The potentiometer 26 is connected as shown in FIG. 2 and for a complete rotation of its wiper, the wiper provides a voltage output of triangular waveform 32 shown in FIG. 3. The wiper of potentiometer 26 is adjusted by means of the angularly adjustable coupling 34, such that the vertex of the triangular waveform occurs when the vertical beam antenna and cursor are in registration in azimuth. After this initial adjustment, any time the cursor is manually adjusted in azimuth, the wiper of potentiometer 26 is angularly adjusted relative to the antenna assembly, whereby the vertex of the triangular waveform is displaced in azimuth the same extent as the cursor. The center of the azimuth acquision gate for the vertical beam is determmined by the azimuthal angle of the vertical antenna at which the vertex of the triangular waveform is produced. The triangular waveform is coupled into an azimuth gate generator 36. The azimuth gate generator 36 includes a manually operable gate width adjust 38 for determining the voltage level at which the triangular waveform performs a switching function. By way of example, the gate generator may include a sharp cut-off tube whose cut-off bias may be adjusted to any voltage up to the peak of the triangular waveform whereby the tube generates a rectangular waveform for the azimuth gate. In a broader sense the azimuth gate generator is essentially any fast-acting electronic switch, relay, or other device that will provide a steep-sided gating waveform when energized by a voltage exceeding a selected threshold voltage and terminates the gating waveform when the input voltage falls below that threshold voltage; the gate width adjust 38 operates a direct current bias device which determines the minimum input voltage required for the azimuth gate generator to produce the gating waveform. If the gate width adjust 38 is manipulated in a direction to increase the bias, the duration of the gating waveform from the azimuth gate generator is a reduced fraction of a revolution of the antenna assembly. The output of the azimuth gate generator is coupled into a coincidence circuit 40 for the vertical beam azimuth gate and the vertical beam range gate as described below.

Figure 3:
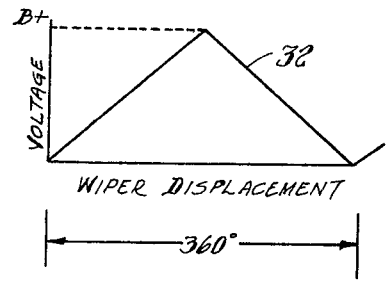
FIG. 3 illustrates the waveform obtained from the potentiometer shown in FIG. 2.
Figure 4:
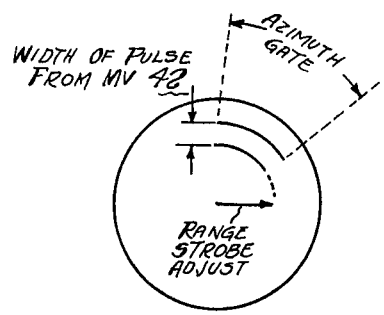
FIG. 4 illustrates the vertical beam space gate provided by the circuit in FIGS. 1a and 1b.
Figure 8:
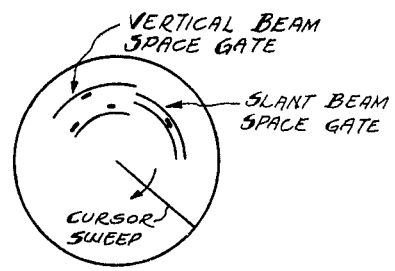
FIG. 8 shows the presentation on the cathode ray tube of the PPI obtained with this invention.

The range strobe generator 20 generates short pulses at the same pulse repetition frequency as the transmitter and its range adjust 22 is operable to adjust the time phase of the pulses from the range strobe generator relative to the transmitter pulses. The range strobe generator 20 is coupled to and triggers monostable multivibrator 42 which generates a pulse of a predetermined length which is sufficient to completely cover the target in range without losing the target between antenna rotations. The pulses from the multivibrator 42 are coupled into the coincidence circuit 40 as vertical beam range gate pulses. The operator adjusts the range strobe generator to select a particular target. The output of coincidence circuit 40 is coupled into a differentiator and inverter circuit 44 for providing spike pulses of the same polarity coincident with the leading and trailing edges of each pulse from monostable multivibrator 42. These pulses are coupled into the radar's PPI and are presented as two arcs on the cathode ray tube of the PPI as shown in FIG. 4. Both arcs have the same azimuthal limits. The angular extent of the arcs is determined by the azimuthal gate width adjust 38 and the azimuthal location of the centers of the arcs is determined by the setting of the PPI cursor adjust 24 which determines at which angular orientation of the vertical beam antenna the peak of the waveform 32 shown in FIG. 3 occurs. The radial distance between the arcs is related to the pulse width from multivibrator 42. The radius of the inner arc is determined by the setting 22 of the range strobe 20. These two arcs represent the acquisition gates in range and azimuth for the vertical beam receiving channel. The arcs are the loci of the pair of brightened spots produced by the spike pulses from the differentiator and inverter circuit 44 along the successive radial sweeps. The vertical beam video from the vertical beam receiving channel 14 and the vertical beam space gate from coincidence circuit 40 are coupled into coincidence circuit 46 whereby vertical beam video acquired during the space gate are transmitted to the height computer 48. The volume of space and targets within that volume of space gated into the height computer are presented on the face of the PPI oscilloscope as shown in FIG. 8.

Figure 5:
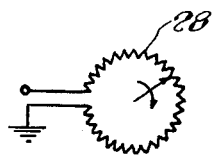
Figure 6:
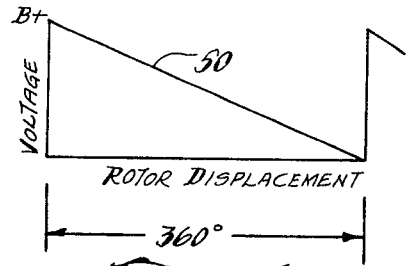
FIG. 6 illustrates the waveform obtained from the potentiometer shown in FIG. 5.

The continuous turn potentiometer 28 governs the width of the slant beam azimuth gate; potentiometer 28 is connected as in FIG. 5 and when the wiper is rotated, it provides a sawtooth waveform output 50 as in FIG. 6. An initial adjustment is made between the antenna assembly, the cursor, and the wiper arm of potentiometer 28 such that the vertex of the sawtooth waveform in FIG. 6 follows the vertex of the triangular waveform in FIG. 3 by a predetermined angular displacement of the antenna assembly. After this initial adjustment of the wiper arm of potentiometer 28, manipulation of cursor adjust 24 displaces the wiper arms of both potentiometers together with respect to the antenna assembly whereby the vertices of the waveforms in FIGS. 3 and 6 are advanced or retarded. For example, after the initial adjustment, if the cursor is moved in azimuth 5 degrees clockwise, the vertices of the triangular and sawtooth waveforms are advanced clockwise 5 degrees in azimuth in terms of rotation of the antenna assembly.

The reason that the slant beam gate is obtained from a sawtooth waveform rather than a triangular waveform is that the slant beam azimuth gate must occur immediately after the vertical beam azimuth gate. When the duration of the vertical beam azimuth gate is adjusted the starting point of the slant beam azimuth gate is not changed by adjusting its duration.

The output of the wiper of potentiometer 28 is coupled into the slant beam azimuth gate generator 52 having a gate width adjust 54, and which may be the same as azimuth gate generator 36. The output of azimuth gate generator 52 is coupled into a coincidence circuit 56 which may be the same as coincidence device 40. A single pole double-throw switch 58 is coupled to the other input of coincidence device 56 and when its contactor engages contact 60 the output of multivibrator 42 is coupled into coincidence circuit 56 as the slant beam range gate. The output of coincidence circuit 56 is coupled into differentiator and inverter circuit 62, which may be the same as differentiator and inverter circuit 44. The output spikes of the differentiator and inverter circuit 62 are coupled into the PPI 18 and when the contactor of the switch 58 is as shown in FIG. 1b, the vertical beam space gate arcs and the slant beam space gate arcs are essentially end to end. The slant beam video from slant beam receiving channel 16 and the slant beam space gate from coincidence circuit 56 are coupled into coincidence circuit 64 which transmits the slant beam video acquired during the slant beam space gate to the height computer 48. The height computer receives pulses from angular displacement to pulse converter 66 to provide information on the azimuth displacement. The pulses may be derived from a magnetic reluctance unit including a gear-like member rotating in train with the antenna assembly past a magnetic pickup whereby a pulse is generated per predetermined small unit of angular displacement of the antenna assembly. In other words, when the antenna is rotating, a train of angle metering pulses is coupled into the height computer.

Figure 7:
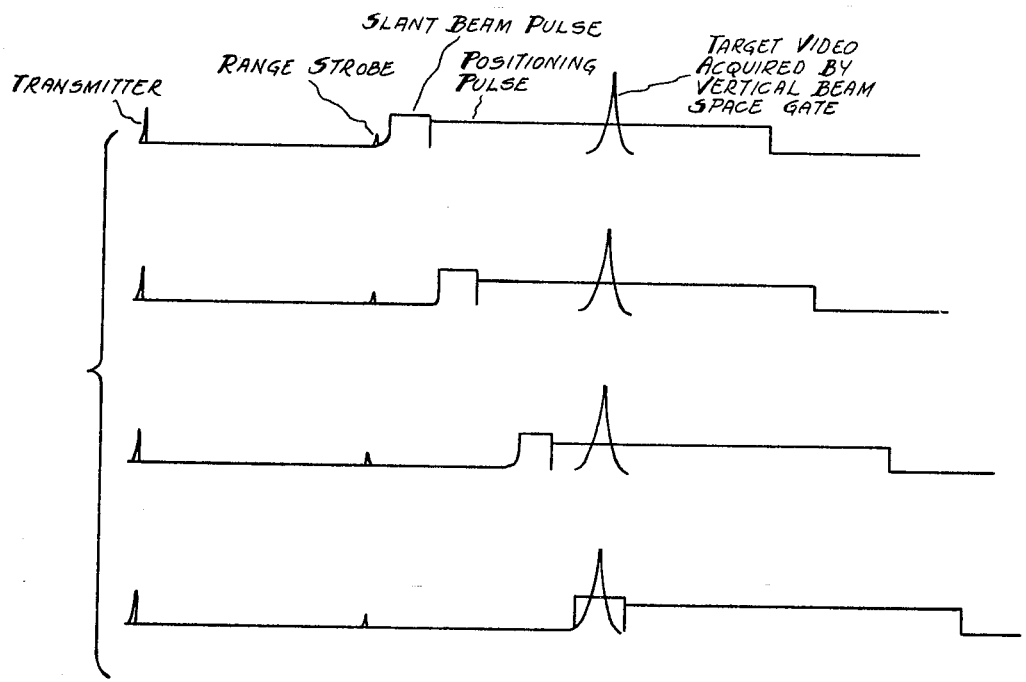
FIG. 7 illustrates graphically the relationship between transmitter pulses, range strobe pulses, the width of the pulses from the vertical gate multivibrator triggered by the range strobe, and the pulses from the multivibrators in the automatic ranging circuit.

A slant beam automatic ranging circuit 68 is connected to the other terminal 61 of switch 58 to provide a slant beam range gate much narrower in range than the vertical beam range gate. This ranging circuit includes a phantastron delay circuit 70 coupled to the range strobe generator 20. When the range strobe emits a pulse and triggers the multivibrator 42 which supplies the vertical beam range gate, it also triggers the phantastron delay circuit 70. The bottoming of the phantastron delay circuit triggers slant beam gate monostable multivibrator 72 which, upon return to its stable state, triggers position gate monostable multivibrator 74. The pulse width of the output from multivibrator 72 is a minor fraction of the pulse width of the output from multivibrator 42, while the pulse width from multivibrator 74 is approximately equal to the pulse width from the multivibrator 42. This relationship is illustrated in FIG. 7. The output of multivibrator 74 is coupled into gated amplifier 76 to gate the latter on and off coincident with the leading and trailing edges of each of its output pulses, e.g. employing a sharp cut-off tube. The vertical beam space gated video from coincidence circuit 46 is coupled into gated amplifier 76 and any video pulses coupled into the gated amplifier while it is in the gated on state are delivered to an integrator circuit 78 having a reset 80 to discharge the capacitor of the integrator. A cathode follower isolation circuit 82 is connected between the integrator 78 and the phantastron delay circuit 70 whereby when charge is supplied to the integrator, a direct current control voltage proportional to the charge on the capacitor of the integrator is fed back by the cathode follower to the phantastron delay circuit to increase its delay.

FIG. 7 illustrates the operation of the slant beam automatic ranging circuit 68 relative to a succession of transmitter pulses during the portion of a rotation of the antenna assembly when the vertical beam azimuth acquisition gate is open. The four transmitter pulses shown in FIG. 7 are a sampling of the series of transmitter pulses emitted when the vertical beam acquisition gate is open. FIG. 7 shows the target video acquired by the vertical beam space gate. The range strobe generator provides one pulse for each transmitter pulse a preselected time following the respective transmitter pulse in accordance with the setting of the range adjust 22. In the upper three graphical illustrations of FIG. 7 the target video occurs within the limits of the positioning pulses from multivibrator 74 and is delivered by the gated amplifier 76 to the integrator 78 successively increasing the charge stored in the integrator. With increase in charge stored in the intergrator, the control voltage to the phantastron is increased, increasing the delay between the range strobe pulse and the triggering of multivibrator 72. The incremental increases in delay are shown in the upper three graphical illustrations of FIG. 7. In the lowermost graphical illustration of FIG. 7 the target video is no longer coincident with the positioning pulses from multivibrator 74 but is squarely coincident with the slant beam gate pulse from multivibrator 72. When this occurs, the integrator receives no more charge, the phantastron delay is not increased any further and the pulses from multivibrator 72 remain over the target. The computer receives several progessively delayed pulses from multivibrator 72 but before the gate is closed, the pulses from multivibrator 72 are coincident with the target video. The pulses from multivibrator 72 are coupled to terminal 61 of switch 58 to serve as slant beam range gate. The pulses from multivibrator 72 are much shorter in time and thus much shorter in range than the vertical beam range gate. As long as target video that appears under the vertical beam space also appears under the output of multivibrator 74, the phantastron delay will be increased. Therefore, the slant beam range gate will fix on the last target in range which appears under the vertical beam space gate. A slant beam space gate is obtained from coincidence of the slant beam azimuth gate and the slant beam range gate. The slant beam space gate is applied to the height computer and also is differentiated and applied to the face of PPI cathode ray tube as the vertical beam space gate. In the presence of multiple targets in the vertical beam space gate, the slant beam video that is gated into the computer and displayed by the PPI is shown in FIG. 8.

A blanking pulse circuit may be added to the embodiment shown in FIGS. 1a and 1b to respond to the first target echo in azimuth received under the vertical beam space gate during each rotation of the antenna assembly, for blanking any video during the remainder of the vertical beam azimuth gate generator whereby the slant beam range gate is centered upon the first target appearing in the vertical beam space gate rather than upon the target furthest in range. By employing this technique, the possibility of ambiguity in the computor is virtually eliminated, since only one target in the vertical beam space gate is coupled to the computer.

The advance in the art attained by this invention is as follows. The prior art need for a range-height indicator (RHI), RHI operator, and interconnecting data link is elminated. Weight and size are reduced many fold compared to standard RHI. Performance is improved. Automatic height finding coverage with this invention extends out to about 200 miles in range and up to about 100,000 feet in altitude. Operator errors are reduced because operation is automatic except for manual target tracking. The height-finding technique is simplified. Target handling capacity is limited only by the speed and ability of the operator to select targets. Automatic range gating in the slant beam reduces the susceptibility of the system to confusion by multiple targets during conditions of high target density. Any V-beam radar system may be readily converted to an automatic system by incorporating the teachings of this invention.

The PPI operator performs his normal task of tracking the target in azimuth and range. In doing so, he establishes range and azimuth coordinates which automatically align the positions of the target gates. Therefore, target gating does not add to the job of the PPI operator. To provide height data on a target once every scan, the computer requires range and azimuth data once every scan. If automatic target tracking is used, target acquisition is the only task required of the operator.

The target handling capacity in the automatic height finding system of this invention is limited by the time required by the operator to position the azimuth cursor and range strobe on a target, the speed of a register operated by the computer, and the time required by the operator to read the height register and to press a reset button on the computer.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:
1. A V-beam radar system comprising:
   a V-beam antenna assembly rotatable in azimuth,
   a vertical beam receiving channel and a slant beam receiving channel for vertical beam video and slant beam video respectively from the antenna assembly,
   a PPI equipment including a cathode ray tube display operatively coupled to the antenna assembly and operable to produce a cursor sweep that tracks the antenna assembly in azimuth, said PPI equipment further including an adjustable azimuth cursor,
   a range strobe generator coupled to the PPI and having a range adjust for selectively locating a range mark along the cursor sweep,
   a monostable multivibrator coupled to the range strobe generator for generating a vertical beam range gate,
   a differential gear having input, output, and means for adjusting the relative angular orientation between input and output, the input being operatively coupled to said antenna assembly for rotation therewith, the means for adjusting the relative angular orientation and the azimuth cursor being coupled for angularly displacing input and output of the differential gear in equal amount to the azimuth displacement of the azimuth cursor,
   a circuit including a continuous-turn potentiometer with a rotatable wiper for providing a triangular waveform for each complete rotation of the wiper, for use in vertical beam azimuth gating, the wiper being operatively coupled to the differential output for rotation therewith and angularly adjustable relative thereto,
   another circuit including a continuous turn potentiometer with a rotatable wiper for providing a sawtooth waveform for each complete rotation of the wiper, for use in slant beam azimuth gating, the wiper being operatively coupled to the differential output for rotation therewith and angularly adjustable relative thereto,
   a vertical beam azimuth gate generator and a slant beam azimuth gate generator coupled to the outputs of the respective circuits, each gate generator having an independent gate width adjust for selecting a threshold level for the input waveform, and providing a rectangular waveform for each input waveform, the edges of the rectangular waveform being in time coincidence with the intersections of the threshold level and the input waveform,
   a coincidence circuit coupled to outputs of said vertical beam azimuth gate generator and said monostable multivibrator and responsive thereto to generate a vertical beam space gate,
   a coincidence circuit coupled to the vertical beam receiving channel and to the coincidence circuit that generates the vertical beam space gate, and providing to the PPI equipment the vertical beam video within the vertical beam space gate,
   a slant beam automatic range gate generator coupled to the output of the range strobe generator and to the output of said coincidence circuit that provides only the vertical beam video within the vertical beam space gate, to generate a slant beam range gate which is a minor fraction of the vertical beam range gate and that covers in range slant beam video from a target which is the furthest in range acquired by the vertical beam space gate,
   a coincidence circuit coupled to the output of said slant beam azimuth gate generator and the output of said slant beam automatic range gate generator and responsive thereto to generate a slant beam space gate,
   means coupled to said antenna assembly and generating a pulse in response to each predetermined increment of angular displacement of the antenna assembly in azimuth,
   a coincidence circuit coupled to the slant beam receiving channel and to the coincidence circuit providing the slant beam space gate and providing the PPI the slant beam video within the slant beam space gate,
   a height computer coupled to the pulse generating means that is responsive to azimuth displacement of the antenna assembly, to the output of the coincidence circuit that provides only the vertical beam video within the vertical beam space gate, and to the output of the coincidence circuit that provides only the slant beam video within the slant beam space gate.

2. A V-beam radar system as defined in claim 1, further including:
   a differentiator and inverter circuit coupled at its input to the output of the coincidence circuit providing the vertical beam space gate and coupled at its output to the PPI to produce on the cathode ray tube presentation of the PPI arcuate lines corresponding to the vertical beam space gate, and
   another differentiator and inverter circuit coupled at its input to the output of the coincidence circuit providing the slant beam space gate and coupled at its output to the PPI to produce on the cathode ray tube presentation of the PPI arcuate lines corresponding to the slant beam space gate.

3. A V-beam radar system as defined in claim 1, wherein said slant beam automatic range gate generator comprises:
   a phantastron delay circuit coupled at its input end to the range strobe generator,
   a monostable multivibrator coupled to the output of the phantastron delay circuit for producing the slant beam range gate pulse at a time following the range strobe pulse dependent upon the delay introduced by the phantastron delay circuit,
   another monostable multivibrator coupled to the output of the monostable multivibrator that produces slant beam range gate pulses, for generating a pulse in essentially immediate time succession to each slant beam range gate pulse and of a width approximately equal to the vertical beam range gate,
   a gated amplifier coupled to the said another monostable multivibrator and to vertical beam video within the vertical beam space gate to provide an output whenever there is time coincidence between the output of said another monostable multivibrator and vertical beam video within the vertical beam space gate,
   an integrator coupled to the output of said gated amplifier and including a reset for discharging the integrator,
   a cathode follower coupled to the integrator and providing to the phantastron delay circuit a delay controlling direct current voltage proportional to the integrator charge whereby the output of the monostable multivibrator that produces slant beam range gate pulses is automatically shifted to cover the vertical beam video furthest in range in the vertical beam space gate.

References Cited by the Examiner
UNITED STATES PATENTS

| 3,072,902 | 1/1963 | Bernstein et al. | 343—11 |
| 3,078,459 | 2/1963 | Vadus et al. | 343—11 |
| 3,087,154 | 4/1963 | Kuecken | 343—11 X |

CHESTER L. JUSTUS, *Primary Examiner.*

P. M. HINDERSTEIN, *Assistant Examiner.*